(12) United States Patent
Perkinson et al.

(10) Patent No.: US 11,752,838 B2
(45) Date of Patent: Sep. 12, 2023

(54) VARIABLE FLOW ADAPTERS FOR AIR DIFFUSERS OF HVAC SYSTEMS

(71) Applicant: Air Distribution Technologies IP, LLC, Milwaukee, WI (US)

(72) Inventors: Ryan M. Perkinson, Plano, TX (US); Kazim C. Demirhan, Garland, TX (US); Mark J. Costello, Plano, TX (US); Hajo C. M. Siemers, Allen, TX (US)

(73) Assignee: AIR DISTRIBUTION TECHNOLOGIES IP, LLC, Milwaukee, WI (US)

(*) Notice: Subject to any disclaimer, the term of this patent is extended or adjusted under 35 U.S.C. 154(b) by 801 days.

(21) Appl. No.: 16/432,698

(22) Filed: Jun. 5, 2019

(65) Prior Publication Data

US 2020/0331323 A1    Oct. 22, 2020

Related U.S. Application Data

(60) Provisional application No. 62/837,040, filed on Apr. 22, 2019.

(51) Int. Cl.
*B60H 1/34* (2006.01)

(52) U.S. Cl.
CPC ... *B60H 1/3414* (2013.01); *B60H 2001/3471* (2013.01)

(58) Field of Classification Search
CPC ........... B60H 1/3414; B60H 2001/3471; F24F 13/10; F24F 13/16; F24F 13/06; F24F 2013/0612; F24F 11/72
USPC ......................................................... 454/152
See application file for complete search history.

(56) References Cited

U.S. PATENT DOCUMENTS

| | | | |
|---|---|---|---|
| 3,961,748 A | 6/1976 | McNabney | |
| RE30,953 E | 6/1982 | Vance et al. | |
| 4,508,022 A * | 4/1985 | Finkelstein | F24F 1/01 454/299 |
| 4,616,559 A | 10/1986 | Barlow | |
| 5,069,114 A * | 12/1991 | Sodec | F24F 13/068 454/297 |
| 5,569,078 A | 10/1996 | Kirkpatrick | |
| 6,176,777 B1 | 1/2001 | Smith et al. | |
| 8,002,013 B2 | 8/2011 | Brown et al. | |

(Continued)

FOREIGN PATENT DOCUMENTS

EP    2561285    2/2013

*Primary Examiner* — Steven B McAllister
*Assistant Examiner* — Charles R Brawner
(74) *Attorney, Agent, or Firm* — Fletcher Yoder, PC

(57) ABSTRACT

An air diffuser for a heating, ventilation, and/or air conditioning (HVAC) system includes a variable flow adapter including a housing and an actuator configured to transition between actuation states based on an air flow parameter in the housing. The air diffuser includes a first plurality of nozzles disposed in the housing and defining a first set of flow paths from an interior of the housing to an exterior of the housing. Additionally, the air diffuser includes a second plurality of nozzles disposed in the housing and defining a second set of flow paths from the interior of the housing to an exterior of the housing. The air diffuser also includes a valve system configured to be actuated by the actuator to control air flow through the second set of flow paths of the second plurality of nozzles.

18 Claims, 10 Drawing Sheets

(56) References Cited

U.S. PATENT DOCUMENTS

| | | | |
|---|---|---|---|
| 2011/0124279 A1* | 5/2011 | Paavilainen | F24F 1/01 |
| | | | 454/264 |
| 2015/0247648 A1 | 9/2015 | Söderberg et al. | |
| 2016/0305677 A1 | 10/2016 | Hirsch et al. | |
| 2018/0128512 A1 | 5/2018 | Costello et al. | |
| 2020/0326082 A1* | 10/2020 | Osheroff | F24F 13/14 |

* cited by examiner

VARIABLE FLOW ADAPTERS FOR AIR DIFFUSERS OF HVAC SYSTEMS

CROSS REFERENCE TO RELATED APPLICATION

This application claims priority from and the benefit of U.S. Provisional Application Ser. No. 62/837,040, entitled "VARIABLE FLOW ADAPTERS FOR AIR DIFFUSERS OF HVAC SYSTEMS," filed Apr. 22, 2019, which is hereby incorporated by reference in its entirety for all purposes.

BACKGROUND

The present disclosure relates generally to heating, ventilation, and/or air conditioning (HVAC) systems. A wide range of applications exists for HVAC systems. For example, residential, light commercial, commercial, and industrial systems are used to control temperatures and air quality in indoor environments and buildings. Such systems may be dedicated to either heating or cooling, although systems are common that perform both of these functions. Very generally, these systems operate by implementing a thermal cycle in which fluids are heated and cooled to provide air flow at a desired temperature to a controlled space, typically the inside of a residence or building. For example, a refrigerant circuit may circulate a refrigerant through one or more heat exchangers to exchange thermal energy between the refrigerant and one or more fluid flows, such as a flow of air.

Generally, air diffusers may be utilized to distribute air conditioned by an HVAC system from a duct into a conditioned space of a building. Typically, an air diffuser is mounted to a ceiling, wall, and/or floor of the conditioned space and is coupled to an outlet of the duct. From this position, the air diffuser may transfer conditioned air from an air handler of the HVAC system to the conditioned space. Unfortunately, certain air diffusers do not provide significant dispersion of the conditioned air within the conditioned space for a wide variety of flow rates of the conditioned air. Instead, particular air diffusers may be designed for either relatively low flows or relatively high flows of conditioned air. Accordingly, there is a demand for air diffusers that can efficiently disperse conditioned air for a wide range of operating conditions of the HVAC system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

SUMMARY

In one embodiment of the present disclosure, an air diffuser for a heating, ventilation, and/or air conditioning (HVAC) system includes a variable flow adapter including a housing and an actuator configured to transition between actuation states based on an air flow parameter in the housing. The air diffuser includes a first plurality of nozzles disposed in the housing and defining a first set of flow paths from an interior of the housing to an exterior of the housing. Additionally, the air diffuser includes a second plurality of nozzles disposed in the housing and defining a second set of flow paths from the interior of the housing to an exterior of the housing. The air diffuser also includes a valve system configured to be actuated by the actuator to control air flow through the second set of flow paths of the second plurality of nozzles.

In another embodiment of the present disclosure, a variable flow adapter configured to be positioned within an air diffuser to direct conditioned air from a duct to a conditioned space includes a pressure-actuated device and a main body defining an interior volume therein. The variable flow adapter includes a first plurality of nozzles that is fixed open to fluidly couple the interior volume of the main body to the conditioned space. Additionally, the variable flow adapter includes a second plurality of nozzles configured to be actuated by the pressure-actuated device to fluidly couple and decouple the interior volume to the conditioned space in response to a pressure of the conditioned air transitioning with respect to a threshold pressure.

In a further embodiment of the present disclosure, a heating, ventilation, and/or air conditioning (HVAC) system includes an air diffuser configured to couple to ductwork of the HVAC system. The HVAC system includes a mounting plate of the air diffuser defining an opening configured to receive conditioned air from the ductwork, as well as a diffusion plate of the air diffuser configured to direct the conditioned air into a conditioned space. The HVAC system includes a variable flow adapter disposed between the mounting plate and the diffusion plate. The HVAC system also includes a main body of the variable flow adapter. Further, the HVAC system includes a first plurality of nozzles and a second plurality of nozzles each disposed in the main body. Each of the first plurality of nozzles and the second plurality of nozzles is configured to provide a flow path from an interior of the main body to an exterior of the main body. The first plurality of nozzles is fixed open. The HVAC system also includes a pressure-actuated device configured to actuate to supply the conditioned air to the second plurality of nozzles based on a pressure of the conditioned air.

Other features and advantages of the present application will be apparent from the following, more detailed description of the embodiments, taken in conjunction with the accompanying drawings which illustrate, by way of example, the principles of the application.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Further, geometric terms should not be rigidly interpreted in a mathematical sense, but rather in a general sense, as would be understood by one of ordinary skill in the art.

The present disclosure is directed to a variable flow adapter for an air diffuser of a heating, ventilation, and/or air conditioning (HVAC) system. The variable flow adapter may be included in an air diffuser to improve an amount of diffusion of conditioned air into a conditioned space. In particular, the variable flow adapter is a hybrid air diffuser that accommodates a wide range of delivery air flows by actuating between a low flow configuration and a high flow configuration. For example, the variable flow adapter of some embodiments may include a set of nozzles for dispersing air supplied at low flow rates and a damper for dispersing air supplied at high flow rates. Via the nozzles, the variable flow adapter may increase a velocity of the conditioned air flowing from ductwork into the conditioned space to enhance diffusion of the conditioned air even when the conditioned air is flowing through the ductwork at relatively low flow rates, low pressures, and/or low volumes. Then, when the damper is actuated, the variable flow adapter may disperse the conditioned air within the conditioned space at a flow rate that is greater than flow rates achievable by the nozzles alone.

Additionally, the variable flow adapter of other embodiments may include multiple sets of nozzles, including a first set of nozzles that supplies the conditioned air at low flow rates without assistance, as well as a second set of nozzles that assist or work with the first set of nozzles to collectively supply the conditioned air at high flow rates. As discussed in more detail herein, the variable flow adapter therefore provides increased heating and/or cooling to the conditioned space when conditioned air flowing through the ductwork is received by the air diffuser at any suitable operating flow rate, pressure, and/or volume.

Figure 1:
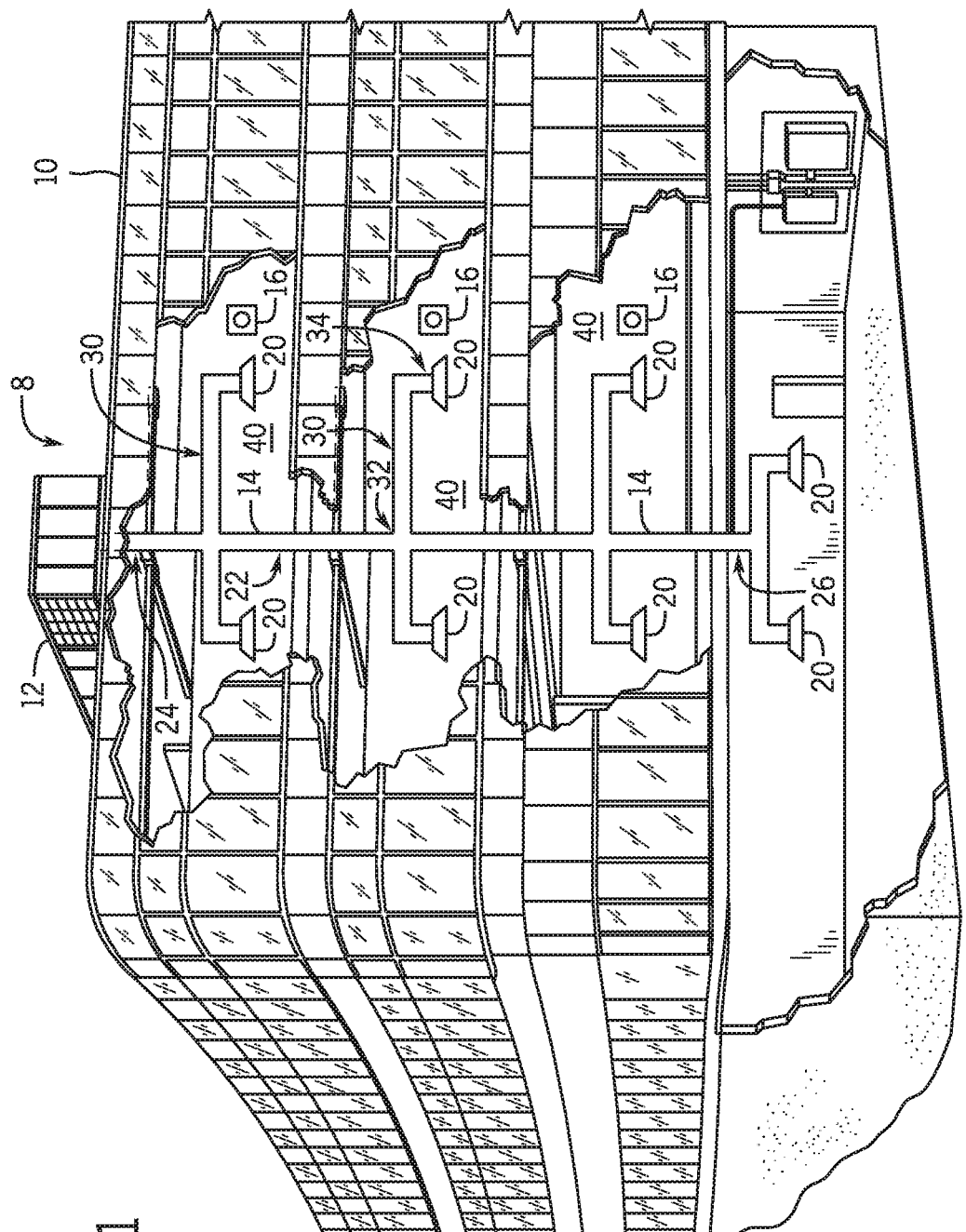
FIG. 1 is a perspective view of an embodiment of a commercial or industrial HVAC system, in accordance with an aspect of the present disclosure.

Turning now to the drawings, FIG. 1 illustrates an embodiment of a heating, ventilation, and/or air conditioning (HVAC) system 8 for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an HVAC system may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An HVAC system is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by the HVAC system 8 that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system that includes an outdoor HVAC unit and an indoor HVAC unit.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the HVAC system 8, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Moreover, the previously-discussed ductwork 14 includes air diffusers 20 coupled thereto to facilitate delivery of conditioned air to occupied spaces in the building 10. As shown in the illustrated embodiment, the ductwork 14 includes a primary duct 22, which is fluidly coupled with an output of the HVAC unit 12 at a first end 24 of the primary duct 22. In some embodiments, a second end 26 of the primary duct 22 may be positioned at any suitable location within or external to the building 10. Additionally, the ductwork 14 may include one or more secondary ducts 30 to direct conditioned air from the primary duct 22 to the air diffusers 20. Therefore, a first end 32 of each of the secondary ducts 30 may be fluidly coupled to the primary duct 22 and a second end 34 of each of the secondary ducts 30 may be fluidly coupled to a respective air diffuser 20. Accordingly, the primary duct 22 and the secondary ducts 30 may collectively direct conditioned air from the HVAC unit 12 toward the one or more air diffusers 20.

Each air diffuser 20 may disperse conditioned air into a respective conditioned space 40 or interior space of the building 10, thereby providing heating and/or cooling to the conditioned space 40, However, in some cases, a flow rate of the conditioned air flowing from the HVAC unit 12, and thus the primary duct 22, may fluctuate. For example, a flow rate of the conditioned air from the HVAC unit 12 may fluctuate between relatively low and relatively high values over an operating range of the HVAC unit 12. Generally, dispersion of the conditioned air into the conditioned spaces 40 may decrease as the flow rate of the conditioned air through typical air diffusers decreases. In some cases, when the flow rate of the conditioned air falls below a threshold, these typical air diffusers may not supply a desired amount of heating and/or cooling to the conditioned space 40 suitable to reach a set point of the control device 16 or a thermostat. Alternatively, certain typical air diffusers may be designed to provide only relatively high flow rates of the conditioned air, leading to potential discomfort of the occupants when only a small amount of the conditioned air would be preferred to condition the conditioned space 40. Additionally, although discussed herein with primary reference to the flow rate of air, it should be understood that pressures and/or volumes of air provided by the HVAC unit 12 or induced from the conditioned space 40 may also be considered.

To appropriately distribute the conditioned air at any suitable flow rates of the HVAC unit 12, the air diffusers 20 disclosed herein each include a variable flow adapter that is adjustable or actuatable between various operating configurations, which are each suited for a particular range of flow rates of the conditioned air. More particularly, the variable flow adapter is able to provide a wide range of delivery air flows by adjusting a combination of air flow delivery devices between a low flow configuration and a high flow configuration. For example, damper-and-nozzle style variable flow adapters with both a damper and nozzles are discussed below, followed by multi-nozzle style variable flow adapters with multiple sets of nozzles. As will be understood, embodiments of the air diffusers 20 having the variable flow adapter disclosed herein may provide efficient dispersion of the conditioned air into the conditioned space 40 within a wide range of suitable flow rates of the conditioned air. Thus, conditioned spaces 40 of the building 10 may be heated, cooled, or otherwise conditioned to a desired temperature and humidity over an entire possible range of flow rates of the conditioned air provided by the HVAC; unit 12.

Figure 2:
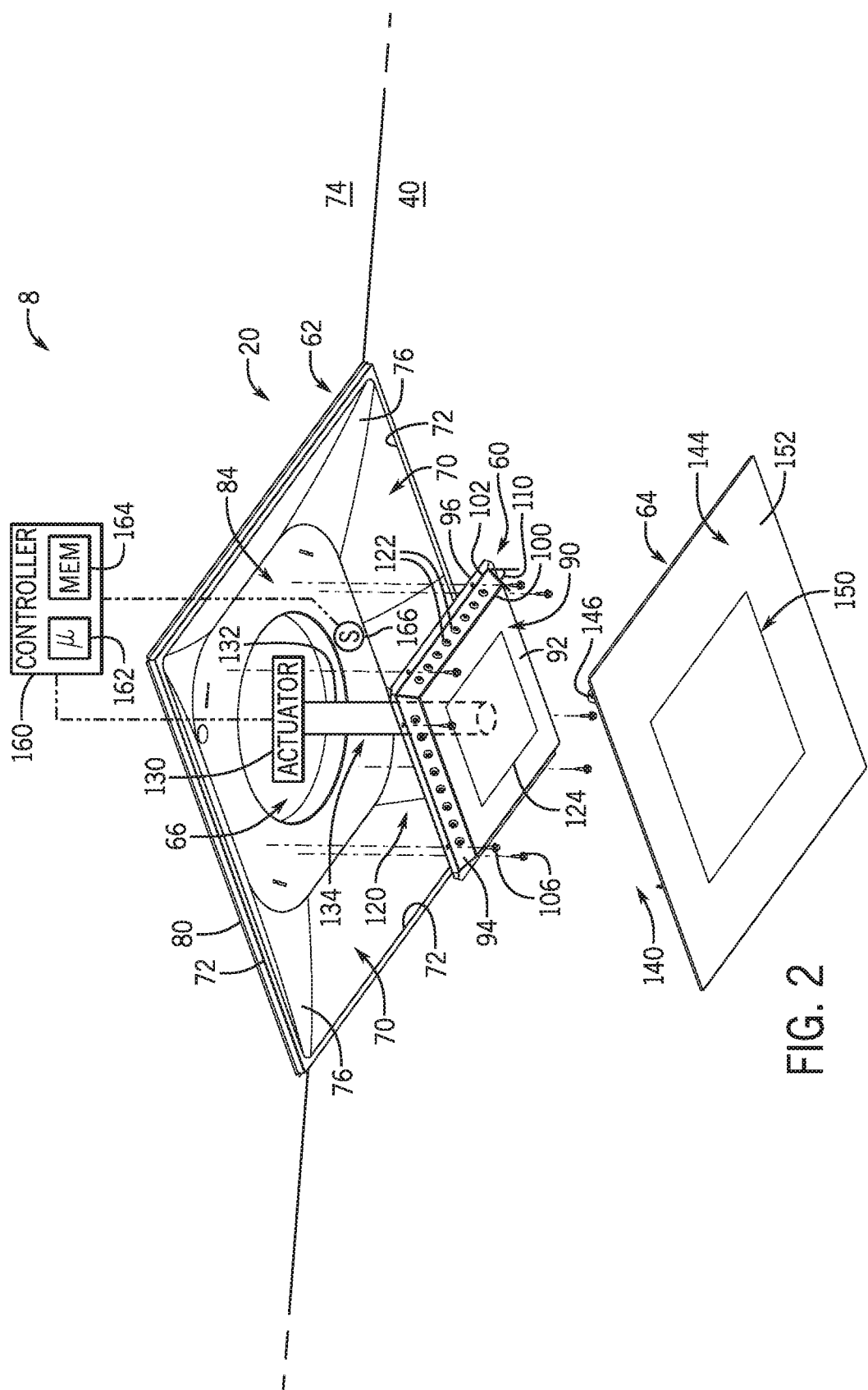
FIG. 2 is an exploded perspective view of an embodiment of an air diffuser with a damper-and-nozzle style variable flow adapter, in accordance with an aspect of the present disclosure.

Looking first to embodiments of the damper-and-nozzle style variable flow adapters, FIG. 2 is an exploded perspective view of the air diffuser 20 of the HVAC system 8 with a variable flow adapter 60 or damper-and-nozzle style variable flow adapter therein. As shown in the illustrated embodiment, the air diffuser 20 includes a mounting plate 62, a diffusion plate 64, and the variable flow adapter 60 therebetween. The mounting plate 62 may be coupled to the second end 34 of a respective secondary duct 30, either directly or indirectly. For example, the mounting plate 62 may include an opening 66 that may be fluidly coupled to an outlet of the respective second end 34 of the secondary duct 30 to receive a flow of conditioned air therefrom. In some embodiments, the opening 66 of the mounting plate 62 may be sealed to the secondary duct 30 to form a substantially air-tight seal between the secondary duct 30 and the air diffuser 20. For example, the mounting plate 62 may be welded to the secondary duct 30 and/or secured to the secondary duct 30 using an adhesive, a fastener, a clamp, and/or another suitable device.

In some embodiments, the mounting plate 62 may include angled or recessed walls 70 that extend inwardly and upwardly from distal edges 72 of the mounting plate 62. Thus, in some embodiments, the recessed walls 70 may extend into a ceiling 74 and toward the secondary duct 30. Additionally, the recessed walls 70 may also be tapered along central edges formed at corners 76 of the mounting plate 62 to facilitate diffusion of the conditioned air as it flows from the variable flow adapter 60 toward the conditioned space 40. The distal edges 72 may include a lip 80 that blocks or prevents the flow of the conditioned air from flowing around the mounting plate 62 toward the ceiling 74 in which the mounting plate 62 may be disposed. Moreover, the distal edges 72 of the mounting plate 62 may be flush or substantially flush with the ceiling 74 of the conditioned space 40 to block or prevent the flow of the conditioned air from flowing into the ceiling 74.

Additionally, the recessed walls 70 may be coupled to a center portion 84 of the mounting plate 62, which may include the opening 66 defined therein. Accordingly, the center portion 84 may be offset from, but substantially parallel to, the ceiling 74 of the conditioned space 40. As used herein, the center portion 84 refers to the substantially planar structural portion of the mounting plate 62 extending between the recessed walls 70. While the present discussion focuses on the air diffuser 20 being mounted to the ceiling 74 of the conditioned space 40, it should be recognized that the air diffuser 20 may be mounted to a wall, a floor, an exposed duct, and/or another suitable surface in the conditioned space 40. In some embodiments, the mounting plate 62 may include a metallic material, such as steel and/or aluminum. In other embodiments, the mounting plate 62 may include another suitable material, such as a ferrous metal or plastic material.

Looking now to details of the variable flow adapter 60, the variable flow adapter 60 includes a main body 90 or housing having a base plate 92, sloped walls 94 extending from the base plate 92, and an outer rim 96 or edge extending from the sloped walls 94. That is, a first end 100 of the sloped walls 94 is coupled to the base plate 92 and a second end 102 of the sloped walls 94 is coupled to the outer rim 96. The variable flow adapter 60 may be coupled to the mounting plate 62 such that the variable flow adapter 60 substantially covers the opening 66, thereby directing all or a portion of the conditioned air that flows from the respective secondary duct 30 through the variable flow adapter 60. For example, in some embodiments, the variable flow adapter 60 may be coupled to the mounting plate 62 by fasteners 106 extended through the outer rim 96 of the variable flow adapter 60 and into the mounting plate 62, When secured to the mounting plate 62 via the fasteners 106, the outer rim 96 of the variable flow adapter 60 may contact the center portion 84 of the mounting plate 62. In some embodiments, the outer rim 96 may be positioned flush or substantially flush with the center portion 84 of the mounting plate 62. Additionally, a sealing gasket, foam, or other material may be positioned between the outer rim 96 of the variable flow adapter 60 and the center portion 84 to improve an air-tightness therebetween during closed configurations of the variable flow adapter 60.

Further, the sloped walls 94 of the variable flow adapter 60 may extend between the outer rim 96 and the base plate 92, such that the variable flow adapter 60 is substantially trapezoidal. This trapezoidal shape may facilitate direction of conditioned air from the secondary duct 30 to the conditioned space 40. As shown in the present embodiment, the sloped walls 94 of the variable flow adapter 60 may extend from the outer rim 96 in a direction toward the conditioned space 40 and away from the opening 66. In some embodiments, the sloped walls 94 may extend from the outer rim 96 at an angle 110 that is less than ninety degrees with respect to the ceiling 74 of the conditioned space 40 and/or the center portion 84 of the mounting plate 62. However, in other embodiments, the variable flow adapter 60 may include another suitable shape.

In some embodiments, the variable flow adapter 60 may be formed from a single piece of sheet material, such as steel sheet metal, aluminum sheet metal, and/or plastic. For example, the outer rim 96, the sloped walls 94, and/or the base plate 92 of the variable flow adapter 60 may be formed by manipulating or bending a single piece of sheet metal into a desired shape. In other embodiments, the variable flow adapter 60 may be formed from an injection mold, and thus include a plastic or polymeric material. In still further embodiments, the variable flow adapter 60 may be formed from multiple pieces of sheet metal and/or other materials.

In any case, an upstream chamber 120 may be formed between the mounting plate 62 and the variable flow adapter 60 that receives the conditioned air produced by the HVAC unit 12. Moreover, as used herein, components described as upstream, midstream, and downstream are identified with reference to a normal direction of air flow through the variable flow adapter 60. Thus, as previously mentioned, the variable flow adapter 60 of the present embodiment is of a nozzle-and-damper style that includes features to enable efficient dispersion of the conditioned air from the upstream chamber 120 at both low and high air flow rates. For example, in the illustrated embodiment, the variable flow adapter 60 includes nozzles 122 or extruded nozzles formed in the sloped walls 94 of the variable flow adapter 60 and a damper 124 formed in the base plate 92 of the variable flow adapter 60.

As discussed in more detail below, at relatively low flow rates of the conditioned air, the nozzles 122 may direct the conditioned air from the upstream chamber 120 at any suitable angle 110 that may enhance diffusion of the conditioned air within the conditioned space 40. To facilitate smooth air delivery, the nozzles 122 may each include a cross-section that is substantially circular. In other embodiments, one or more of the nozzles 122 may include a cross-section that is oval-shaped, square-shaped, polygonal, and/or another suitable shape. Additionally, in some embodiments, the nozzles 122 may each include the same cross-section shape. In other embodiments, the cross-sectional shape of the nozzles 122 may be different from one another.

To direct the conditioned air out of the upstream chamber 120 at relatively high flow rates, such as flow rates greater than those achievable with the nozzles 122 alone, the variable flow adapter 60 of the illustrated embodiment may utilize the damper 124. The damper 124 may be a panel, an annular ring, or any other suitable actuatable component that may selectively open to provide a greater open area through the variable flow adapter 60 than an open area provided by the nozzles 122. For example, in the present embodiment, the damper 124 is a rectangular panel disposed over an opening formed in the base plate 92 of the variable flow adapter 60. However, the damper 124 may have any suitable regular geometric shape that mates with a corresponding opening in the base plate 92. Indeed, in some embodiments, the damper 124 may be sized to operate as or replace the base plate 92 of the variable flow adapter 60, such that the damper 124 is movable relative to the sloped walls 94. In other embodiments discussed in more detail below, the damper 124 may alternatively include the outer rim 96, the sloped walls 94, and the base plate 92 of the variable flow adapter 60, such that the main body 90 of the variable flow adapter 60 is selectively movable to separate the variable flow adapter 60 from the mounting plate 62. As used herein, description of air flowing through the damper 124 refers to the air flowing around the panel and through the opening revealed by the selective adjustment of the damper 124, as would be readily understood by one of ordinary skill in the art. The damper 124 therefore may encompass the portion of the variable flow adapter 60 and/or the mounting plate 62 to which the movable portion of the damper 124 seals.

Moreover, the air diffuser 20 of the illustrated embodiment includes an actuator 130 that is coupled to the damper 124 by a drive shaft 132, each of which may be part of a variable flow adapter system 134 that also includes the variable flow adapter 60. The actuator 130 may be any suitable screw-shaped actuator, motor, servo motor, hydraulic cylinder, or driving element that may apply force to the damper 124 via the drive shaft 132 to selectively open or close the damper 124. The drive shaft 132 may be coupled to any suitable frame or support member that retains the drive shaft 132 between the damper 124 and the actuator 130, enabling force or torque developed by the drive shaft to displace the damper 124 toward or away from the mounting plate 62. As such, when opened, the damper 124 provides a flow path for the conditioned air to flow from the upstream chamber 120 through the opening in the base plate 92. In other words, the actuator 130 actuates the damper between one or multiple configurations, including a first configuration in which the damper 124 blocks the conditioned air 200 from passing therethrough and directs the conditioned air 200 through the nozzles 122, as well as a second configuration in which the damper 124 is open to direct the conditioned air 200 therethrough.

To receive the conditioned air from the nozzles 122 and/or the damper 124, the diffusion plate 64 may be may be positioned below the variable flow adapter 60 with respect to the ceiling 74 of the conditioned space 40. As such, a downstream chamber 140 of the air diffuser 20 is defined between the variable flow adapter 60 and the diffusion plate 64. In the present embodiment, the diffusion plate 64 has a main body 144 that is rectangular-shaped to correspond to the illustrated geometry of the mounting plate 62. However, it should be understood that the diffusion plate 64 may have any suitable shape or features to facilitate dispersion of the conditioned air within the conditioned space 40. The diffusion plate 64 may be coupled to the mounting plate 62 or the variable flow adapter 60 using any suitable fasteners, such as locking brackets 146, threaded bolts, or screws. The diffusion plate 64 may include the same material as the mounting plate 62 and/or the variable flow adapter 60, including steel, aluminum, polymers, and/or another suitable material. In other embodiments, the diffusion plate 64 may include a material different from the mounting plate 62 and/or the variable flow adapter 60.

The air diffuser 20 further includes an energy harvesting device 150 coupled to a distal surface 152 or room-facing surface of the main body 144 of the diffusion plate 64, in the present embodiment. The energy harvesting device 150 may include any suitable components for generating electrical energy as a function of ambient light received from the conditioned space 40, such as solar cells, solar panels, or photovoltaic cells. As such, the energy harvesting device 150 may generate electricity based on the received light and store the electricity in any suitable battery or capacitor. In some embodiments, the energy harvesting device 150 generates electrical energy based on ambient light that is suitable for normal office operations. In other embodiments, other suitable devices may also or alternatively be used instead of the energy harvesting device 150, such as a Peltier device, a Seebeck effect device, a Thompson effect device, a microturbine, and so forth.

In some embodiments, the air diffuser 20 also includes a controller 160 that controls operation of the air diffuser 20. For example, in the present embodiment, the controller 160 is a separate controller for controlling the air diffuser 20 and may therefore enable the air diffuser 20 to operate as an independent, self-contained unit. In some embodiments, a single controller 160 may monitor and control operations of multiple air diffusers 20, such as each air diffuser 20 in a particular room, a region, or the entirety of the building 10. The controller 160 may be communicatively coupled to exchange data and/or instructions with an HVAC controller or another suitable master controller. However, in other embodiments, the controller 160 may be the HVAC controller that governs operation of the entire HVAC system 8, including a compressor, a blower, an outdoor fan, and more, in addition to the air diffuser 20. In these embodiments, the controller 160 may also provide control signals to control flow rates, motor speeds, and valve positions, among other parameters, of the HVAC system 8.

The controller 160 may include a distributed control system (DCS) or any computer-based workstation. For example, the controller 160 can be any device employing a general purpose or an application-specific processor 162, both of which may generally include memory 164 or suitable memory circuitry for storing instructions and/or data. The processor 162 may include one or more processing devices, and the memory 164 may include one or more tangible, non-transitory, machine-readable media collectively storing instructions executable by the processor 162 to control the air diffuser 20. The processor 162 of the controller 160 provides control signals to instruct the air diffuser 20 to perform the control actions disclosed herein. More specifically, the controller 160 may be communicatively coupled to receive input signals from various components of the HVAC system 8, as well as to output control signals that control and communicate with the various components. As such, the controller 160 may provide suitable control signals to control the actuator 130, which manipulates the damper 124 to adjust an air flow path through the variable flow adapter 60. For example, the controller 160 may receive feedback indicative of an operating parameter of the conditioned air from one or multiple sensors 166 disposed within or adjacent to the air diffuser 20. Thus, based on the feedback, the controller 160 may determine a target position for the damper 124 and provide control signals to the actuator 130 to cause the damper 124 to move to the target position, as discussed in more detail below.

Although the controller 160 has been described as including the processor 162 and the memory 164, it should be understood that the controller 160 may include or be communicatively coupled to a number of other computer system components. These other computer system components may enable the controller 160 to control the operations of the HVAC system 8 and the related components. For example, the controller 160 may include a communication component that enables the controller 160 to communicate with other computing systems and electronic devices, such as alarm systems. The controller 160 may also include an input/output component that enables the controller 160 to interface with users via a graphical user interface or the like. In addition, the communication between the controller 160 and other components of the HVAC system 8 may be via a wireless connection, such as a connection through Bluetooth® Low Energy, ZigBee®, WiFi®, or may be a wired connection, such as a connection through Ethernet. In some embodiments, the controller 160 may include the control device 16, a laptop, a smartphone, a tablet, a personal computer, a human-machine interface, or the like. Additionally, the embodiments disclosed herein may be at least partially embodied using hardware implementations. For example, logic elements of the controller 160 may include a field-programmable gate array (FPGA) or other specific circuitry.

Moreover, the present embodiment of the air diffuser 20 may include the sensor 166 introduced above to monitor an operating parameter of the conditioned air, thereby facilitating appropriate operation of the air diffuser 20. For example, the sensor 166 may be any suitable pressure sensor, flow rate sensor, volumetric sensor, or so forth that may detect a pressure, a flow rate, and/or a volume of the air provided by the HVAC unit 12. As shown in the illustrated embodiment, the sensor 166 may be disposed in any suitable position within or upstream of the variable flow adapter 60 to enable the sensor 166 to monitor the conditioned air therein, such as proximate to and/or within the variable flow adapter 60. The sensor 166 is communicatively coupled to the controller 160 and is configured to transmit sensor signals to the controller 160 indicative of the operating parameter of the conditioned air. In other embodiments, the controller 160 may receive sensor signals from multiple sensors 166 or the sensor 166 may transmit sensor signals to the main controller of the HVAC unit 12. Thus, based on the operating parameter, the controller 160 may determine the target position or target operating configuration for the air diffuser 20 and instruct the actuator 130 to move the damper 124 to the target position. In other embodiments, the sensor 166 may be omitted, as the controller 160 may be aware of the operating condition of the HVAC unit 12 based on sensors associated with the HVAC unit 12. In some embodiments, the damper 124 may additionally or alternatively be manually adjustable. Moreover, a sensor may include any suitable instrument capable of acquiring the feedback through direct or indirect observation indicators.

In some embodiments, the energy harvesting device 150 produces and collects sufficient energy to power the sensor 166, the actuator 130, and/or the controller 160, thus enabling the air diffuser 20 to operate as an independent component or self-contained package. In these embodiments, the air diffuser 20 is operable without power from other energy sources, desirably reducing a complexity of installation and operation for the air diffuser 20 compared to non-independent air diffusers. In other embodiments, the actuator 130 of the damper 124 is powered by an external energy source, such as an electrical connection of the building 10, and the energy harvesting device 150 may be omitted from the air diffuser 20 to reduce an assembly complexity thereof.

Figure 3:
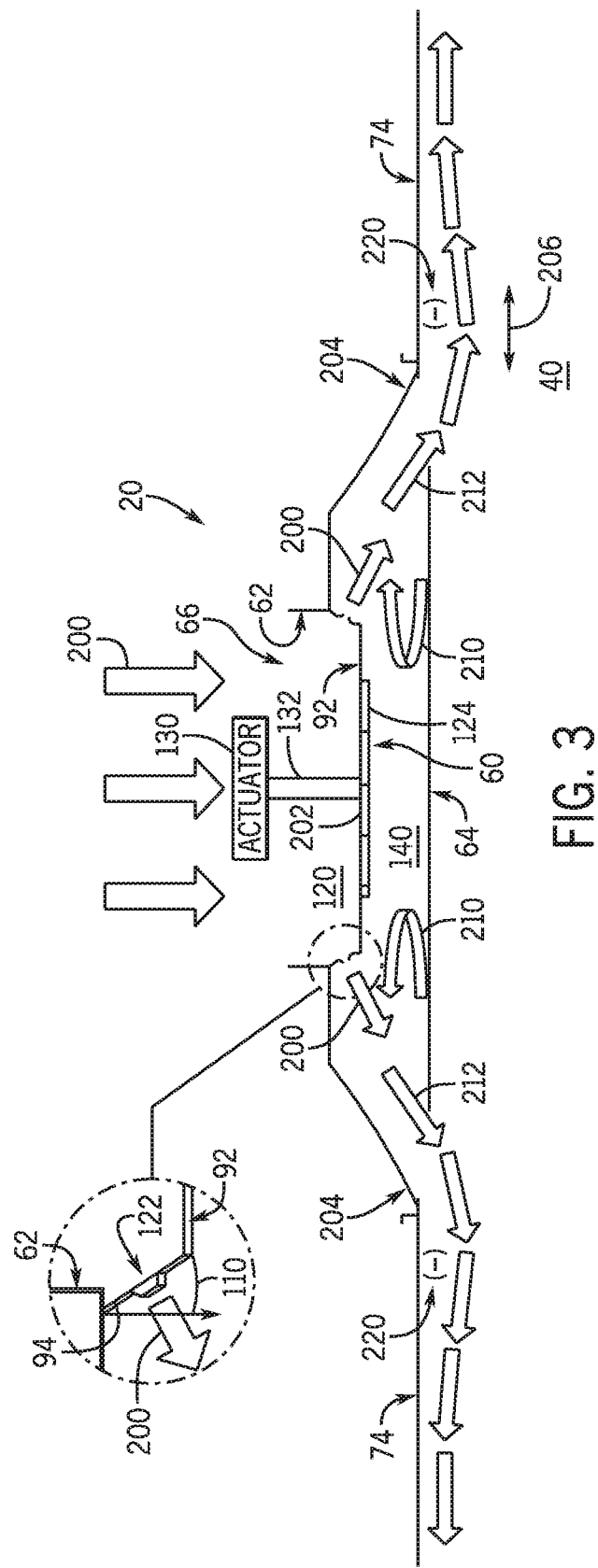
FIG. 3 is a side cross-sectional view of an embodiment of the air diffuser of FIG. 2 having the variable flow adapter with a closed damper, in accordance with an aspect of the present disclosure.

With the above description of components of the air diffuser 20 in mind, FIG. 3 is a side cross-sectional view of the air diffuser 20 with the variable flow adapter 60 operating with the damper 124 closed. During operation of the HVAC unit 12, a flow of conditioned air 200 or primary air may be directed from the opening 66 of the mounting plate 62 into the upstream chamber 120 or interior volume, which is defined between the mounting plate 62 and the variable flow adapter 60. More particularly, when the air diffuser 20 receives relatively low flow rates of the conditioned air 200, such as flow rates beneath a predetermined threshold flow rate, the variable flow adapter 60 may maintain the damper 124 in the illustrated closed position. For example, the controller 160 of FIG. 2 may determine that the flow rate of the conditioned air 200 is beneath a threshold flow rate, and instruct the actuator 130 and the drive shaft 132 to move the damper 124 to, or maintain the damper 124 in, the closed position. A sealing element 202 or gasket may be disposed between the damper 124 and the base plate 92, in some embodiments, thereby facilitating direction of the conditioned air 200 through the set of nozzles 122 when the damper 124 is closed by blocking or preventing air leakage through the damper 124.

With the damper 124 closed, the conditioned air 200 may therefore flow from the upstream chamber 120 and through the nozzles 122, which may increase a velocity or flow rate of the conditioned air 200 flowing toward the conditioned space 40. For example, as pressure builds in the upstream chamber 120, the conditioned air 200 may seek to escape the pressure build-up by traveling through the nozzles 122. Because the nozzles 122 have a reduced cross-sectional area compared to the opening 66 and/or the upstream chamber 120, the velocity of the conditioned air 200 increases as the conditioned air 200 flows through the nozzles 122. This increased velocity of the conditioned air 200 may enhance dispersion of the conditioned air 200 into the conditioned space 40 because the conditioned air 200 may flow further away from the air diffuser 20 at a faster rate when compared to typical air diffusers. Accordingly, the air diffuser 20 enhances heating and/or cooling when the conditioned air flows through the ductwork 14 at relatively low flow rates, pressures, and/or volumes.

In particular, after traversing the nozzles 122, the conditioned air 200 enters the downstream chamber 140, which is defined between the variable flow adapter 60 and the diffusion plate 64. The diffusion plate 64 may therefore facilitate direction of the conditioned air 200 toward edges 204 of the mounting plate 62. By directing conditioned air 200 toward the edges 204, the diffusion plate 64 may cause the conditioned air 200 to engage in horizontal air flow along a horizontal axis 206, which may result in enhanced mixing of the conditioned air with existing air in the conditioned space 40. Indeed, due to the increased velocity of the conditioned air 200 entering the downstream chamber 140, a flow of room air 210 from the conditioned space 40 may be induced within the downstream chamber 140 to create a flow of mixed air 212. The mixed air 212 has a greater volume than the conditioned air 200 alone, thus enabling the air diffuser 20 to spread the mixed air 212 in the conditioned space 40 to perform more efficient conditioning.

That is, because a low pressure region 220 may be formed at or near the edges 204 of the mounting plate 62 by the shape of the air diffuser 20 and the angle 110 of the sloped walls 94, the mixed air 212 is encouraged to flow across the ceiling 74 or along the horizontal axis 206 via the Coanda effect to discharge the mixed air 212 along a greater radius or area. As noted herein, the Coanda effect describes the tendency of a flow of fluid to adhere to a surface. Accordingly, the Coanda, effect causes the mixed air 212 to adhere to the ceiling 74 and flow along a length of the ceiling 74. That is, the components of the air diffuser 20, including the nozzles 122 of the variable flow adapter 60, are configured to direct the conditioned air 200 and/or the mixed air 212 within the conditioned space 40. Other fluid dynamic effects that may influence a flow trajectory of a fluid along a surface may also be utilized by the air diffuser 20, such as static pressure differentials and/or dynamic pressure differentials along a length and/or a width of the fluid flow.

Figure 4:
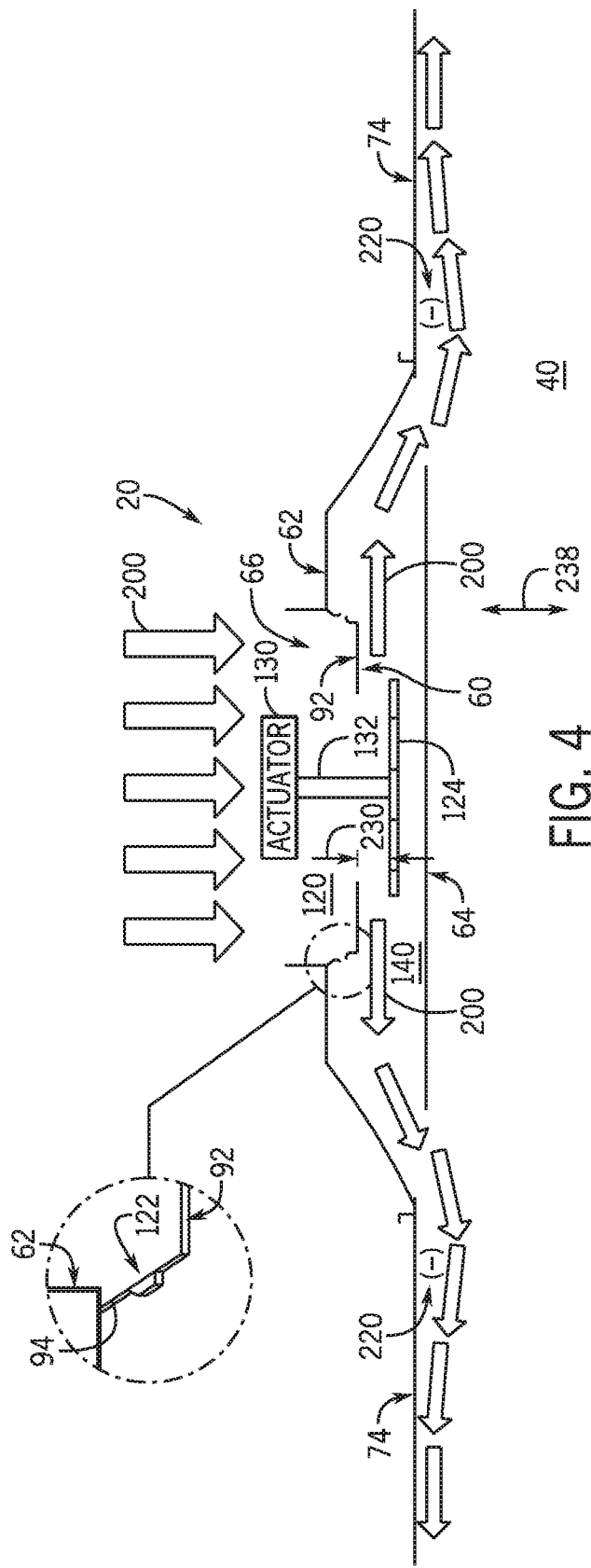
FIG. 4 is a side cross-sectional view of an embodiment of the air diffuser of FIG. 3 having the variable flow adapter with an open damper, in accordance with an aspect of the present disclosure.

FIG. 4 is a side cross-sectional view of the air diffuser 20 with the variable flow adapter 60 in operation with the damper 124 open. As previously mentioned, the controller 160 of FIG. 2 may determine, based on sensor signals from the sensor 166, that the conditioned air 200 that is delivered to the air diffuser 20 has an operating parameter that is above the threshold operating parameter. For example, the controller 160 may determine that a flow level of the conditioned air 200 is greater than a flow level threshold. Based on this determination, the controller 160 may instruct the actuator 130 to vertically adjust the damper 124 to a target operating position. For example, the actuator 130 may include the screw-shaped drive shaft 132 that moves the damper 124 toward or away from the mounting plate 62. In the present embodiment, the damper 124 is lowered by a distance 232 along a vertical axis 238, providing a high-volume flow path from the upstream chamber 120 within the variable flow adapter 60 to the downstream chamber 140 between the variable flow adapter 60 and the diffusion plate 64. The conditioned air 200 air may therefore be directed toward the conditioned space 40 by the diffusion plate 64. Notably, because the open flow path provide by the damper 124 may include a greater open area than an open area of the nozzles 122, the conditioned air 200 may not substantially traverse the nozzles 122. For example, less than 10%, less than 5%, or less than 1% of the conditioned air 200 may pass through the nozzles 122 when the damper 124 is open. As such, room air may not be induced within the downstream chamber 140 when the damper 124 is open. However, in certain embodiments, the damper 124 may be partially opened or positioned such that a non-negligible amount of the conditioned air 200 is distributed through both the nozzles 122 and the damper 124. For example, in some embodiments, the damper 124 may be opened by less than a threshold amount that reveals an opening having an area comparable to the open area of the nozzles 122, such that the upstream chamber 120 remains partially pressurized and the conditioned air 200 flows through the nozzles 122 and the damper 124.

It should be understood that the damper 124 may move between one closed position and at least one open position. In some embodiments, the damper 124 may be continuously displaceable by the actuator 130, such that the actuator 130 may dispose the damper 124 in one of more than 2, more than 4, more than 10, or more than 20 physical positions. Additionally, although shown with the damper 124 having an open position that is moved downward along the vertical axis 238 relative to the base plate 92 and mounting plate 62, it should be understood that the damper 124 may alternatively be positioned above the base plate 92 and moved closer to the mounting plate 62, in other embodiments. Further, although described with reference to the damper 124 that moves vertically along the vertical axis 238, it should be understood that the damper 124 may take any suitable form that enables the damper 124 to be selectively opened to partially or fully depressurize the upstream chamber 120. For example, in some embodiments, the actuator 130 may rotate the damper 124 relative to the base plate 92 to selectively reveal openings, nozzles, and/or any other suitable air delivery components.

Figure 5:
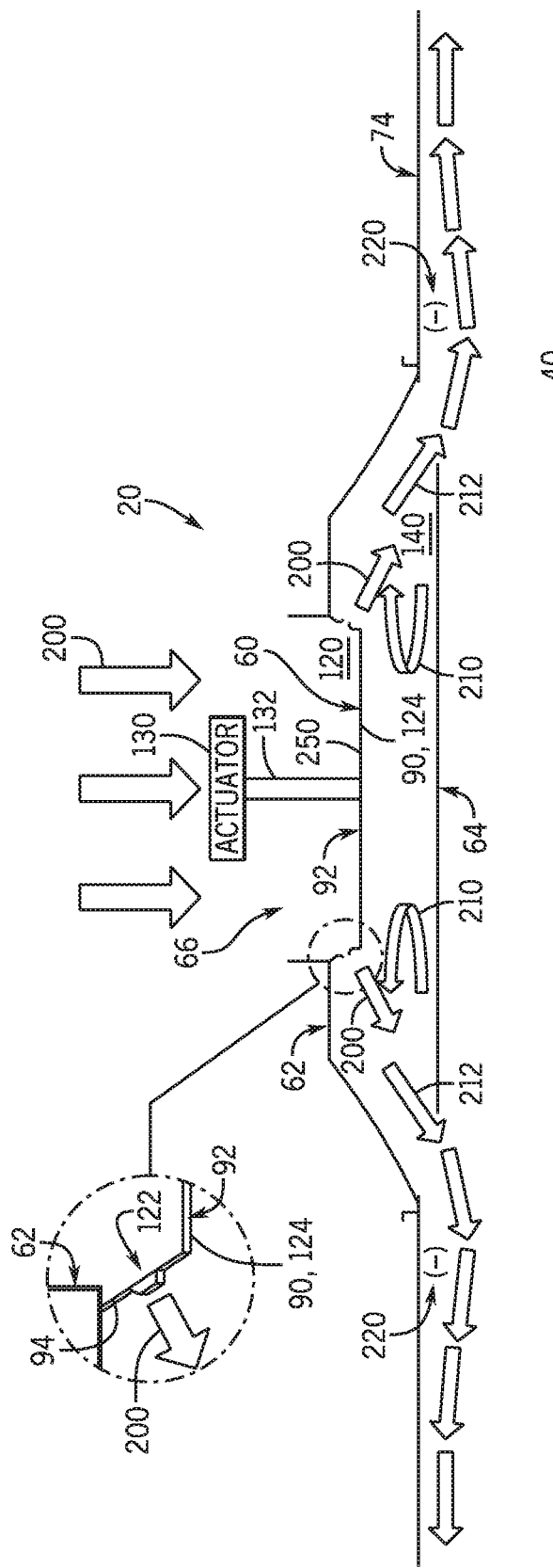
FIG. 5 is a side cross-sectional view of an embodiment of an air diffuser in which the variable flow adapter is a damper in a closed position, in accordance with an aspect of the present disclosure.

As mentioned above, the damper 124 may be embodied within alternative portions of the variable flow adapter 60. For example, FIG. 5 is a side cross-sectional view of an embodiment of the air diffuser 20 in which the damper 124 is the main body 90 of the variable flow adapter 60. The damper 124 therefore includes the nozzles 122 disposed therein, such as within the sloped walls 94 of the variable flow adapter 60. The drive shaft 132 may be coupled between the variable flow adapter 60 and the actuator 130 at any suitable location, such as an inner surface 250 of the base plate 92, With the damper 124 in the illustrated closed position, the variable flow adapter 60 may desirably direct relatively low flow rates of the conditioned air 200 through the set of nozzles 122, thereby providing the conditioned air 200 as the mixed air 212 at an increased velocity. Indeed, as previously discussed with respect to FIG. 3, the increased velocity of the conditioned air 200 may induce the room air 210 to flow within the downstream chamber 140, which exits the air diffuser 20 as the mixed air 212 in a generally horizontal direction and disperses within the conditioned space 40.

Figure 6:
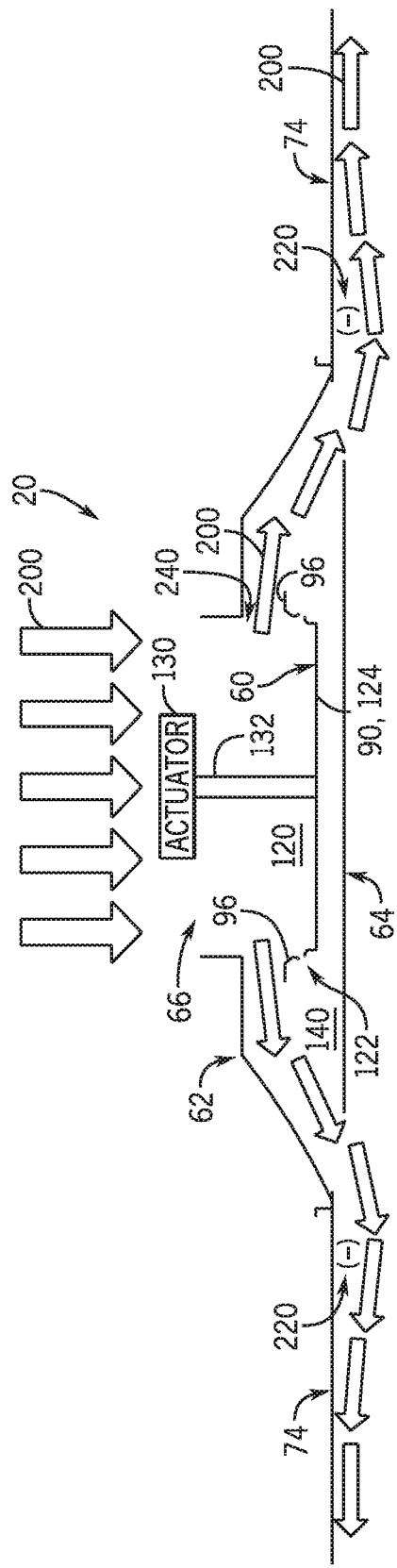
FIG. 6 is a side cross-sectional view of an embodiment of the air diffuser of FIG. 5 having the damper in an open position, in accordance with an aspect of the present disclosure.

FIG. 6 is a side cross-sectional view of an embodiment of the air diffuser 20 having the damper 124 of the variable flow adapter 60 in an open position. For example, in response to determining that the operating parameter of the conditioned air 200 is above the threshold operating parameter, the controller 160 may instruct the actuator 130 to move the damper 124 away from the mounting plate 62. Thus, a circumferential opening 240 is revealed between the outer rim 96 of the damper 124 and the center portion 84 of the mounting plate 62. Indeed, similar to the embodiment illustrated in FIG. 4, the presently illustrated embodiment of the variable flow adapter 60 provides a greater open area out of the variable flow adapter 60 via the damper 124 for the conditioned air 200 to flow than the open area of the nozzles 122. As with other embodiments, it should be understood that different relative amounts of the conditioned air 200 may be selectively directed through the damper 124 and/or the nozzles 122 by virtue of the positioning of the damper 124. Moreover, as air is directed through the damper 124 and/or the nozzles 122, a small amount of air may inherently traverse other features of the variable flow adapter 60 by nature of the operation of the variable flow adapter 60, but is not considered to be directed through these other features.

In some embodiments, the controller 160 may instruct the actuator 130 to move the damper 124 to one of multiple open positions. For example, in response to determining that the operating parameter of the conditioned air 200 meets a first threshold operating parameter, the controller 160 may cause the damper 124 to move to a first open position. Then, in response to determining that the operating parameter meets a second threshold operating parameter, greater than the first threshold operating parameter, the controller 160 may cause the damper 124 to move to a second open position, having a greater distance from the mounting plate 62 and therefore distributing a greater flow rate of the conditioned air 200. Accordingly, the conditioned air 200 from the HVAC unit 12 enters the upstream chamber 120, traverses the damper 124 into the downstream chamber 140, and disperses within the conditioned space 40. Via the presently disclosed damper-and-nozzle style variable flow adapters 60, the disclosed embodiments of the air diffuser 20 may provide targeted flow rates of the conditioned air 200 to the conditioned space 40 to improve both air flow delivery and occupant comfort over the entire range of operating conditions of the HVAC unit 12.

Figure 7:
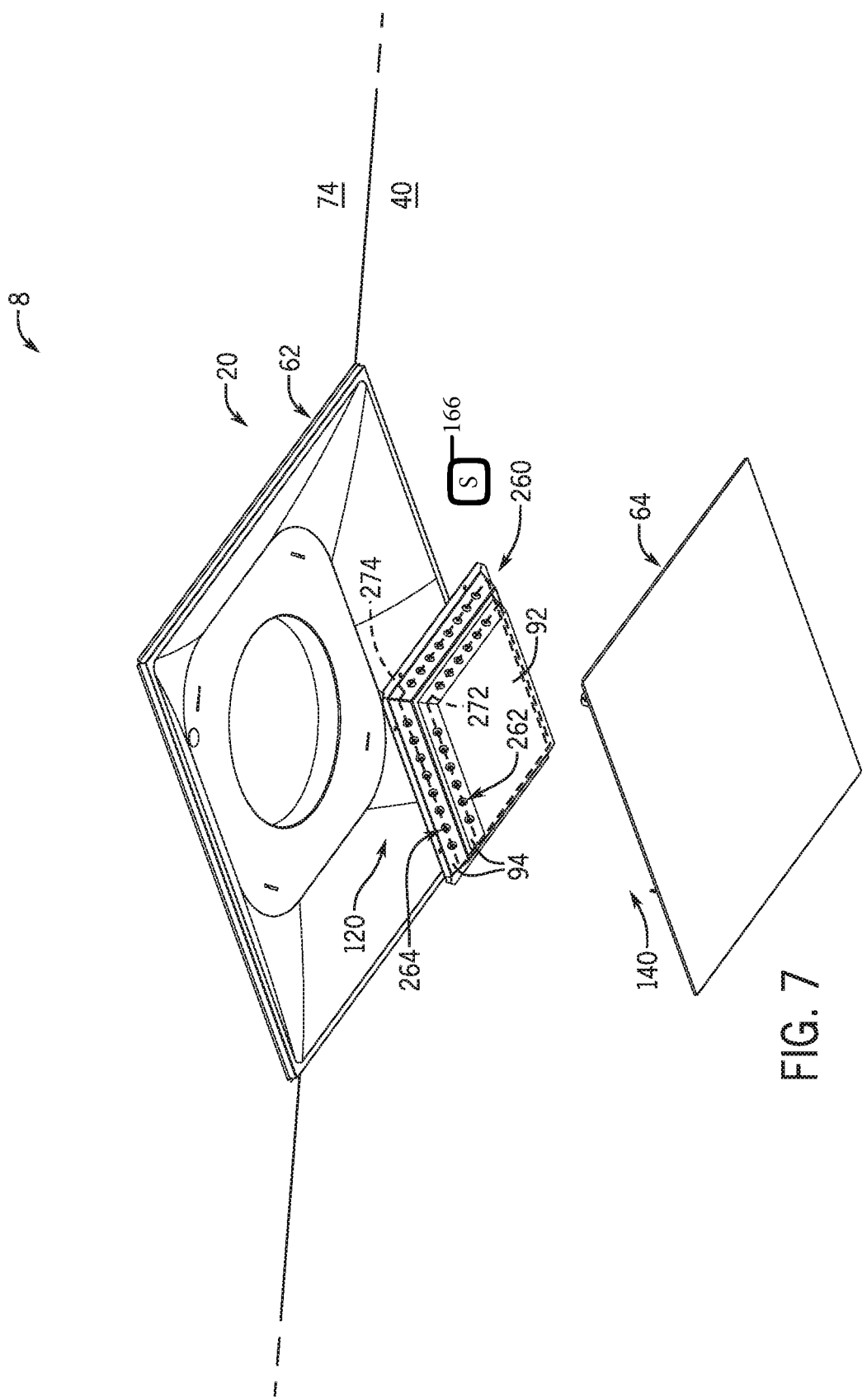
FIG. 7 is an exploded perspective view of an embodiment of an air diffuser with a multi-nozzle style variable flow adapter, in accordance with an aspect of the present disclosure.

As another embodiment for providing targeted air flows to the conditioned space 40, the previously-mentioned multi-nozzle style variable flow adapters are discussed herein. For example, FIG. 7 is an exploded perspective view of an embodiment of the air diffuser 20 with a variable flow adapter 260 therein that has a multi-nozzle style. The air diffuser 20 is a portion of the HVAC system 8 and includes the mounting plate 62 and the diffusion plate 64, which each may be formed and operate as discussed above. However, in contrast to the variable flow adapter 60 discussed above, the variable flow adapter 260 disposed between the mounting plate 62 and the diffusion plate 64 includes both a first set of nozzles 262 and a second set of nozzles 264, where the second set of nozzles 264 includes a larger number of nozzles than the first set of nozzles 262, as shown. The variable flow adapter 260 similarly includes a housing including a base plate 92, as well as the sloped walls 94 extending between the base plate 92 and the mounting plate 62. As such, the first set of nozzles 262 defines a first set of flow paths from within the housing to an exterior of the housing, and the second set of nozzles defines a second set of flow paths from within the housing to the exterior of the housing. Notably, the first set of nozzles 262 is disposed around a first perimeter 272 of the sloped walls 94 and the second set of nozzles 264 is disposed around a second perimeter 274 of the sloped walls 94. The first perimeter 272 is closer to the base plate 92 than the second perimeter 274 is; however, it should be understood that the sets of nozzles 262, 264 may have other arrangements than the one illustrated herein. For example, each nozzle of the first set of nozzles 262 may be staggered relative to one another, in some embodiments. Moreover, although illustrated with both set of nozzles 262, 264 formed within the sloped walls 94 of the variable flow adapter 260, it should be understood that the sets of nozzles 262, 264 may be positioned in any location of the variable flow adapter 260 suitable for directing the conditioned air to the conditioned space 40. Additionally, due in part to the trapezoidal shape of the variable flow adapter 260, the first set of nozzles 262 may include fewer nozzles than the second set of nozzles 264, in some embodiments.

To provide the conditioned air 200 to the conditioned space 40 at low flow rates, the variable flow adapter 260 may direct the conditioned air 200 through one set of nozzles 262, 264, while maintaining the other set of nozzles 262, 264 in a closed position. Then, should the pressure of the conditioned air 200 reach a threshold pressure, the variable flow adapter 260 may use one or multiple actuating components to transition from a first actuation state to a second actuation state that fluidly connects the upstream chamber 120 to the downstream chamber 140 via both sets of nozzles 262, 264. In other words, one or both of the sets of nozzles 262, 264 may be passively actuated by pressure. In other embodiments, the sets of nozzles 262, 264 may be actively actuated by the controller 160 in response to sensor signals, similar to the actuator 130 of FIG. 2 discussed above. As such, the variable flow adapter 260 may selectively adapt the open area provided by the variable flow adapter 260 for the conditioned air 200 to travel through, enabling the air diffuser 20 to suit multiple ranges of air flows over all or a majority of the operating conditions of the HVAC unit 12.

Figure 8:
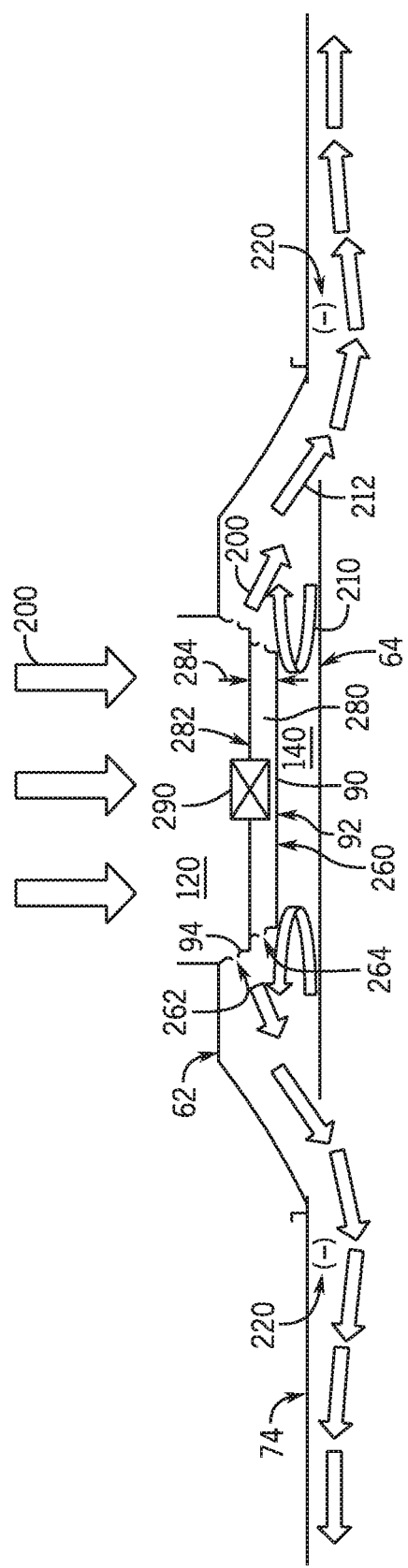
FIG. 8 is a side cross-sectional view of an embodiment of the air diffuser of FIG. 7 in which multiple sets of nozzles are fluidly coupled to a respective chamber, in accordance with an aspect of the present disclosure.

FIG. 8 is a side cross-sectional view of an embodiment of the air diffuser 20 in which the first set of nozzles 262 of the variable flow adapter 260 is fluidly coupled to the upstream chamber 120 and the second set of nozzles 264 is fluidly coupled to a midstream chamber 280 or closed chamber. Particularly, the variable flow adapter 260 includes an inner plate 282 or barrier extending between the sloped walls 94 at a position that is vertically offset from the base plate 92 of the variable flow adapter 260. As such, the midstream chamber 280 is defined between a lower portion 284 of the sloped walls 94, the inner plate 282, and the base plate 92. Additionally, a pressure-actuated device 290 or actuator having any suitable valve system is disposed within the inner plate 282, thereby controlling whether the conditioned air 200 may enter the midstream chamber 280 based on a pressure of the conditioned air 200. The pressure-actuated device 290 may be any suitable pressure-responsive component that enables the conditioned air 200 to flow through the inner plate 282 in an open configuration and enter the midstream chamber 280 based on its pressure. For example, the pressure-actuated device 290 may be a pressure relief valve, a bladder including a central portion that receives the pressure and lifts edge portions of the bladder in response to the pressure, and so forth. In some embodiments, the valve system of the pressure-actuated device 290 may include a valve that selectively enables air flow through each nozzle of the second set of nozzles 264. Moreover, although discussed herein with respect to passive control elements, it should be understood that the pressure-actuated device 290 may alternatively include a controller-instructed component or actuator, such as a damper that reveals an opening within the inner plate 282 based on instructions from the controller 160 of FIG. 2 discussed above.

As such, based on the pressure of the conditioned air 200, the pressure-actuated device 290 couples and decouples the upstream chamber 120 to the midstream chamber 280. In this manner, the pressure-actuated device 290 may direct the conditioned air 200 to flow into the downstream chamber 140 either via only the first set of nozzles 262 or via both the first set of nozzles 262 and the second set of nozzles 264. In any case, the sets of nozzles 262, 264 induce room air 210 to enter the downstream chamber 140 of the air diffuser 20, facilitating further dispersion of the resulting mixed air 212 within the conditioned space 40.

Figure 9:
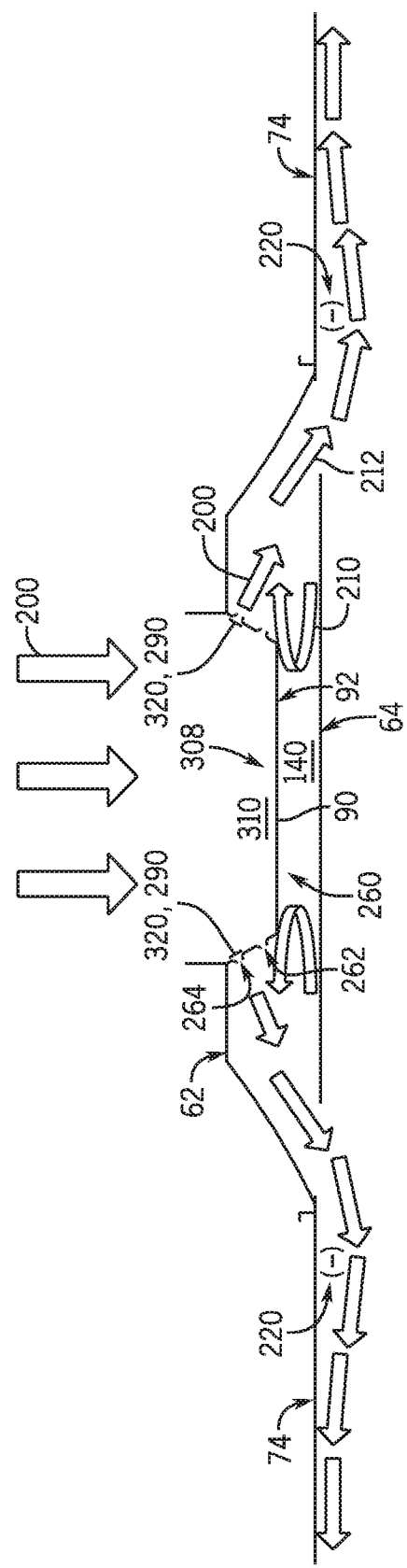
FIG. 9 is a side cross-sectional view of an embodiment of the air diffuser of FIG. 7 in which multiple sets of nozzles are fluidly coupled to a central chamber, in accordance with an aspect of the present disclosure.

As an alternative to segmenting the volume of the variable flow adapter 260 into the upstream chamber 120 and the midstream chamber 280, FIG. 9 is a side cross-sectional view of an embodiment of the air diffuser 20 having the variable flow adapter 260 in which both the first set of nozzles 262 and the second set of nozzles 264 are fluidly coupled to a central chamber 308. The central chamber 308 defines a complete interior volume 310 of the variable flow adapter 260 via the sloped walls 94 and base plate 92 discussed above.

The first set of nozzles 262 are fixedly open, thus enabling the air diffuser 20 to direct relatively low flows of the conditioned air 200 from the central chamber 308, into the downstream chamber 140 between the variable flow adapter 260 and the diffusion plate 64, and then into the conditioned space 40. However, the second set of nozzles 264 are physically blocked or sealed by the pressure-actuated device 290, which may selectively enable the second set of nozzles 264 to fluidly couple the central chamber 308 to the downstream chamber 140 in response to a pressure of the conditioned air 200. For example, in the present embodiment, the pressure-actuated device 290 is an internal damper 320, internal perimeter damper, or semi-rigid sealing member that may be elastically biased to cover the second set of nozzles 264 when the conditioned air has a pressure that is less than a threshold pressure. Then, in response to the pressure of the conditioned air 200 increasing to the threshold pressure, the internal damper 320 may receive sufficient force from the conditioned air to slide downward and/or off of the second set of nozzles 264. In this manner, the variable flow adapter 260 enables the air diffuser 20 to provide a targeted amount of the mixed air 212 to the conditioned space 40 based on the pressure of the conditioned air delivered by the HVAC unit 12.

Moreover, it should be understood that the pressure-actuated device 290 may take any suitable form that enables the second set of nozzles 264 to be selectively uncovered or actuated in response to the pressure of the conditioned air 200 reaching a threshold pressure. For example, the pressure-actuated device 290 may include a bladder that, in response to the pressure of the conditioned air reaching the threshold pressure, stretches to complete an electrical circuit. Then, the completed electrical circuit may activate an actuator that moves the internal damper 320 introduced above to enable the conditioned air 200 to traverse the second set of nozzles 264. Alternatively, the pressure-actuated device 290 may include a pivoting strip of metal having a V-shaped cross-section that extends within the variable flow adapter 260 to cover the second set of nozzles 264 with one leg of the V-shaped cross-section. Then, in response to sufficient pressure, the pivoting strip of metal may rotate downwards to lift the one leg of the V-shaped cross-section from the second set of nozzles 264. Although discussed with reference to passive actuation of the second set of nozzles, it should be understood that the internal damper 320 may be actively actuated, in some embodiments. As such, the controller 160, the actuator 130, the sensor 166, and/or the energy harvesting device 150 discussed above may also be included within the air diffuser 20 of FIG. 7. In other embodiments, the pressure-actuated device 290 may be manually adjusted.

Moreover, it should be understood that the components described above with respect to individual figures are not limited to the embodiments of those figures. Indeed, it is recognized herein that features of the variable flow adapter 60 and features of the variable flow adapter 260 may be combined, in some embodiments. In these embodiments, a resulting composite variable flow adapter may include: the first set of nozzles 262 that are fixedly-open to deliver a lowest range of flows of the conditioned air 200 to the conditioned space 40, the second set of nozzles 264 that may be actuated in combination with the first set of nozzles 262 to deliver a middle range of flows of the conditioned air 200 to the conditioned space 40, and the damper 124 that may be actuated to provide the greatest open area that delivers the highest range of flows of the conditioned air 200 to the conditioned space 40.

Figure 10:
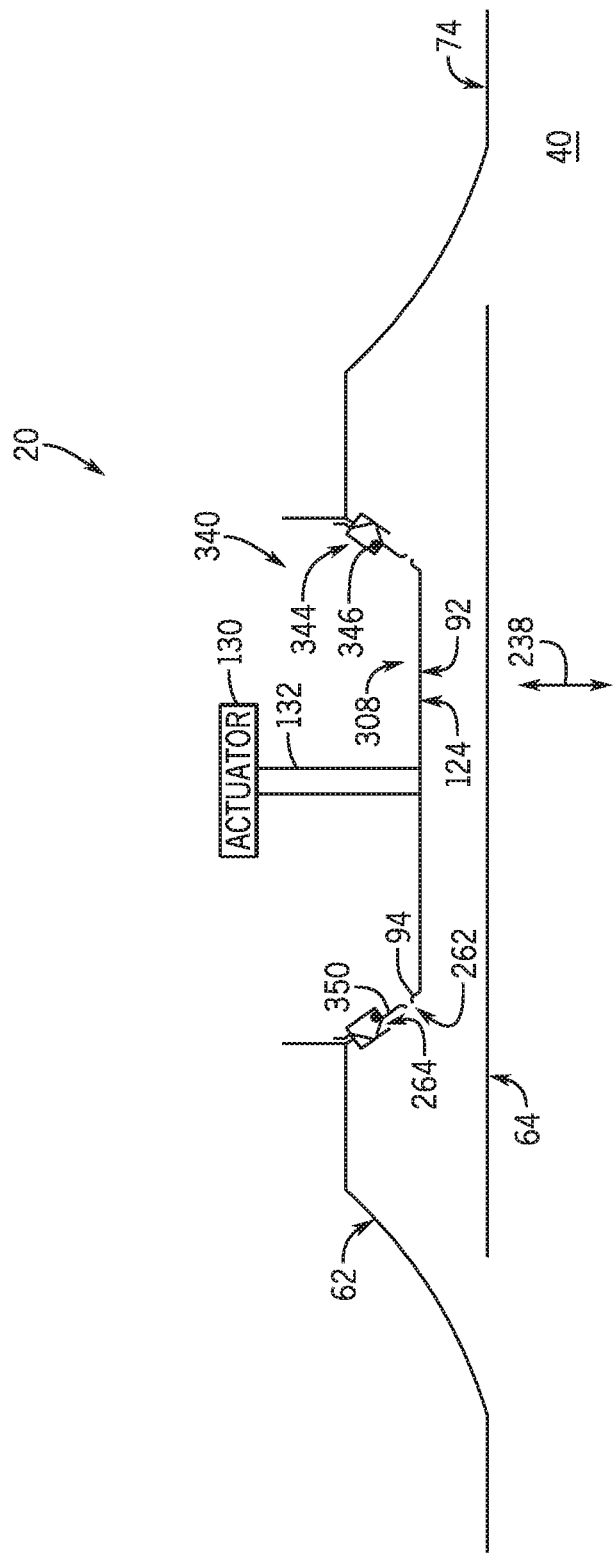
FIG. 10 is a side cross-sectional view of an embodiment of an air diffuser with a composite variable flow adapter having a damper and multiple sets of nozzles, in accordance with an aspect of the present disclosure.

As an example embodiment of the combination of air delivery features, FIG. 10 is a side cross-sectional view of an embodiment of the air diffuser 20 having a composite variable flow adapter 340 with the damper 124, the first set of nozzles 262, and the second set of nozzles 264. In the illustrated embodiment, each of the damper 124, the first set of nozzles 262, and the second set of nozzles 264 define air flow paths from the central chamber 308 of the composite variable flow adapter 340 to the conditioned space 40. The damper 124, which includes the base plate 92 and the sloped walls 94 of the composite variable flow adapter 340, is coupled to the drive shaft 132 and the actuator 130 discussed above with reference to FIG. 5. As such, based on selective movement accorded by the actuator 130, the damper 124 may move along the vertical axis 238 to adjust an open area between the composite variable flow adapter 340 and the mounting plate 62.

Notably, the illustrated embodiment also includes a sealing ring 344 that is coupled to an inner perimeter of the mounting plate 62. The sealing ring 344 includes a U-shaped cross section having a gasket 346 disposed therein that contacts an inner surface 350 of the sloped walls 94 at a position between the first set of nozzles 262 and the second set of nozzles 264. As such, the sealing ring 344 may fluidly seal or cover the second set of nozzles 264 based on the position of the damper 124. In other words, as the damper 124 is moved downward from its illustrated position by the actuator 130, the second set of nozzles 264 is moved out of the sealing ring 344. The damper 124 may be moved further downward to distance the composite variable flow adapter 340 from the mounting plate 62 as discussed above. Thus, the composite variable flow adapter 340 enables distribution of any one of: a low flow of air through the fixed-open first set of nozzles 262 from the illustrated position, an intermediate flow of air through both set of nozzles 264, and a high flow of air through the damper 124 and/or the sets of nozzles 262, 264. It should be understood that any other suitable combination of the features discussed herein is also presently contemplated.

Accordingly, embodiments discussed herein are directed to variable flow adapters 60, 260 that enable the air diffuser 20 to utilize specialized air delivery components for delivering targeted air flows of the conditioned air 200 over an entire range of air flows produced by the HVAC unit 12. Indeed, in contrast to both an air diffuser that delivers conditioned air at low flows and an air diffuser that delivers air at high flows, the present embodiments of the variable flow adapters 60, 260 desirably actuate individualized components to best match the delivered conditioned air 200 to the conditioning demands of the conditioned space 40. For example, the variable flow adapter 60 includes the nozzles 122 for delivering relatively low air flows and the actuatable damper 124 that may be opened in response to a greater air flow. Additionally, the variable flow adapter 260 includes the first set of nozzles 262 that remain permanently open and the second set of nozzles 264 that is selectively actuated by the pressure-actuated device 290 to provide additional outlets from the variable flow adapter 260 in response to an increased flow of the received conditioned air 200. Accordingly, the variable flow adapters 60, 260 each enable the respective air diffuser 20 in which they are positioned to efficiently distribute the conditioned air 200 within the conditioned space 40 for any range of operating parameters of the HVAC unit 12.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An air diffuser for a heating, ventilation, and/or air conditioning (HVAC) system, comprising:
    a variable flow adapter including a housing;
    a first plurality of nozzles disposed in the housing and defining a first set of flow paths from an interior of the housing to an exterior of the housing;
    a second plurality of nozzles disposed in the housing and defining a second set of flow paths from the interior of the housing to the exterior of the housing;
    at least one actuatable device configured to be transitioned, based on an air flow parameter in the housing, between actuation states to control air flow through the second set of flow paths of the second plurality of nozzles; and
    a barrier in which the at least one actuatable device is disposed, wherein:
        the barrier separates a first chamber in the interior of the housing from a second chamber in the interior of the housing, wherein the second is downstream from the first chamber;
        the first plurality of nozzles is fluidly coupled with the first chamber; and
        the second plurality of nozzles is fluidly coupled with the second chamber.

2. The air diffuser of claim 1, wherein the at least one actuatable device is configured to be transitioned between the actuation states based on a pressure corresponding to the air flow parameter.

3. The air diffuser of claim 1, comprising a sensor configured to detect the air flow parameter and generate a sensor signal indicative of the air flow parameter, wherein the at least one actuatable device is configured to be transitioned between the actuations states based on the sensor signal indicative of the air flow parameter.

4. The air diffuser of claim 3, wherein the sensor is disposed upstream of the housing.

5. The air diffuser of claim 1, wherein:
    the at least one actuatable device is disposed in the barrier such that the at least one actuatable device facilitates air flow through the barrier in an open configuration of the actuation states.

6. The air diffuser of claim 5, wherein the at least one actuatable device is a pressure relief valve configured to be transitioned between the actuation states based on a pressure corresponding to the air flow parameter.

7. The air diffuser of claim 1, comprising a mounting plate having an opening configured to receive a flow of conditioned air from ductwork of the HVAC system and a diffusion plate configured to direct the flow of conditioned air into a conditioned space, wherein the variable flow adapter is disposed between the mounting plate and the diffusion plate.

8. The air diffuser of claim 7, wherein the housing of the variable flow adapter comprises a base plate and sloped walls having a first end and a second end, wherein the first end of the sloped walls is coupled to the mounting plate and the second end of the sloped walls is coupled to the base plate, and wherein the first plurality of nozzles and the second plurality of nozzles are each disposed in the sloped walls.

9. The air diffuser of claim 1, wherein each nozzle of the first plurality of nozzles is fixedly open.

10. A variable flow adapter configured to be positioned within an air diffuser to direct conditioned air from a duct to a conditioned space, comprising:
    at least one pressure-actuated device configured to be in a first configuration in response to a first pressure of the conditioned air and configured to be in a second configuration in response to a second pressure of the conditioned air different than the first pressure of the conditioned air;
    a main body defining an interior volume therein;
    a barrier in which the at least one pressure-actuated device is disposed, wherein the barrier extends across the main body and within the interior volume such that the barrier defines an upstream chamber within the interior volume and a midstream chamber within the interior volume, wherein the midstream chamber is downstream from the upstream chamber;
    a first plurality of nozzles fluidly coupled with the upstream chamber, wherein the first plurality of nozzles is fixed open to fluidly couple the upstream chamber to the conditioned space; and
    a second plurality of nozzles fluidly coupled with the midstream chamber, wherein the second plurality of nozzles is configured to fluidly couple the midstream chamber to the conditioned space in response to the at least one pressure-actuated device being in the first configuration and not the second configuration.

11. The variable flow adapter of claim 10, wherein the main body comprises a base plate and sloped walls extending from the base plate, and wherein the first plurality of nozzles and the second plurality of nozzles are each disposed within the sloped walls.

12. The variable flow adapter of claim 11, wherein the first plurality of nozzles is disposed through the sloped walls in a first perimeter of the sloped walls, the second plurality of nozzles is disposed through the sloped walls in a second perimeter of the sloped walls, and the second perimeter is closer to the base plate than the first perimeter.

13. The variable flow adapter of claim 10, wherein the at least one pressure-actuated device comprises a pressure relief valve.

14. A heating, ventilation, and/or air conditioning (HVAC) system, comprising:
    an air diffuser configured to couple to ductwork of the HVAC system;
    a mounting plate of the air diffuser defining an opening configured to receive conditioned air from the ductwork;
    a diffusion plate of the air diffuser configured to direct the conditioned air into a conditioned space;
    a variable flow adapter disposed between the mounting plate and the diffusion plate;
    a main body of the variable flow adapter;
    a barrier extending across the main body such that the barrier defines an upstream chamber internal to the main body and a midstream chamber internal to the main body, wherein the midstream chamber is downstream from the upstream chamber;
    a first plurality of nozzles and a second plurality of nozzles each disposed in the main body, wherein each first nozzle of the first plurality of nozzles is configured to provide a first flow path from the upstream chamber to a downstream chamber outside of the main body and between the main body and the diffusion plate, and each second nozzle of the second plurality of nozzles is configured to provide a second flow path from the midstream chamber to the downstream chamber; and
    a pressure-actuated device coupled to the barrier and configured to actuate from a closed position to an open position to supply a portion of the conditioned air to the second plurality of nozzles in response to a pressure of the conditioned air exceeding a threshold pressure.

15. The HVAC system of claim 14, wherein the main body of the variable flow adapter comprises a base plate and sloped walls extending between the base plate and the mounting plate, and wherein the first plurality of nozzles and the second plurality of nozzles are each disposed in the sloped walls.

16. The HVAC system of claim 14, wherein the pressure-actuated device is configured to be actuated from the closed position to the open position in response to the pressure of the conditioned air exceeding the threshold pressure such that the conditioned air is directed out of the first plurality of nozzles and out of the second plurality of nozzles.

17. The HVAC system of claim 14, wherein the variable flow adapter is configured to induce air flow within the conditioned space to facilitate diffusion of the conditioned air within the conditioned space for each operating condition of the HVAC system.

18. The HVAC system of claim 14, wherein the second plurality of nozzles includes more nozzles than the first plurality of nozzles.

* * * * *